United States Patent [19]

Bailey

[11] 4,125,209

[45] Nov. 14, 1978

[54] COUPLING HEAD HAVING RESILIENT LINER FOR USE WITH PRESSURIZED CASKS

[75] Inventor: Victor S. Bailey, Teddington, England

[73] Assignee: Grundy (Teddington) Limited, Teddington, England

[21] Appl. No.: 834,822

[22] Filed: Sep. 16, 1977

[30] Foreign Application Priority Data

Sep. 17, 1976 [GB] United Kingdom ............... 38665/76

[51] Int. Cl.[2] ....................... B65D 83/14; F16L 37/18; F16L 37/28

[52] U.S. Cl. .................................. 222/400.7; 137/212

[58] Field of Search ...................... 137/212; 222/400.7, 222/400.8

[56] References Cited

U.S. PATENT DOCUMENTS 2,661,019 12/1953 Snyder et al. ................ 222/400.7 X 4,026,316 5/1977 Schots ........................... 222/400.7 X

FOREIGN PATENT DOCUMENTS 1,215,985 12/1970 United Kingdom .................. 222/400.7

*Primary Examiner*—David A. Scherbel

*Attorney, Agent, or Firm*—Emory L. Groff, Jr.

[57] ABSTRACT

A coupling/dispenser head for pressurized casks for liquids the said head being of inverted shell like form, with a resilient liner therein. The liner serves to blank off the gas pressure introduced through the head from the cask until the cask is broached by moving a lever carried by the head to move down a hollow plunger in the head, this action depressing the cask seal ring and distorting the liner so that gas pressure is applied into the cask and liquid can pass out through the plunger.

5 Claims, 5 Drawing Figures

COUPLING HEAD HAVING RESILIENT LINER FOR USE WITH PRESSURIZED CASKS

BACKGROUND OF THE INVENTION

This invention relates to coupling or dispensing heads for pressurised casks and like containers for liquids, the casks having a bung hole outlet which for transportation is sealed by a spring-loaded ring seal located concentrically around the head of a liquid extractor tube. The coupling head to which the invention relates includes an inverted cup like shell with means at its lower end to engage a collar around the bung hole outlet and having an inlet for gas under pressure, there being a hollow plunger axially within the shell, which plunger has a head at its lower end to co-operate with the ring seal and is moveable axially by a manually operable lever extending from the coupling head, so that, in use with the coupling head engaged on the collar, when the plunger is moved down from its raised position, the plunger head depresses the ring seal to broach the cask. This action also puts the head of the extractor tube in communication with the bore through the plunger and brings the gas pressure into the cask so that liquid can be dispensed up through the plunger and from a valve controlled dispensing tap, the arrangement also sealing the liquid outlet from the gas pressure in the cask.

An object of this invention is to provide a dispenser head of simple construction which has no sliding seals. A further object is to provide a head which can be cleaned easily by present day systems.

SUMMARY OF THE INVENTION

According to the invention, the shell has a resilient liner therein and through which the plunger passes the liner having a duct therein leading from the gas inlet to the cup to the plunger head, and an inner surface part engaging on the plunger, when the plunger is in the raised position, to seal the gas inlet from the interior of the cask, and a lower portion to seat on and seal the cask outlet around the ring seal and wherein downward movement of the plunger causes its head to depress the ring seal and also to distort the liner thereby to break the gas seal so that gas pressure enters the cask around the plunger head.

With the above arrangement, the liner provides a seal for the gas pressure when the plunger is raised and for the cask outlet when the plunger is lowered.

BRIEF DESCRIPTION OF THE DRAWINGS

Embodiments of the invention will now be described with reference to the accompanying drawings in which.

DESCRIPTION OF THE PREFERRED EMBODIMENT

Figure 1:
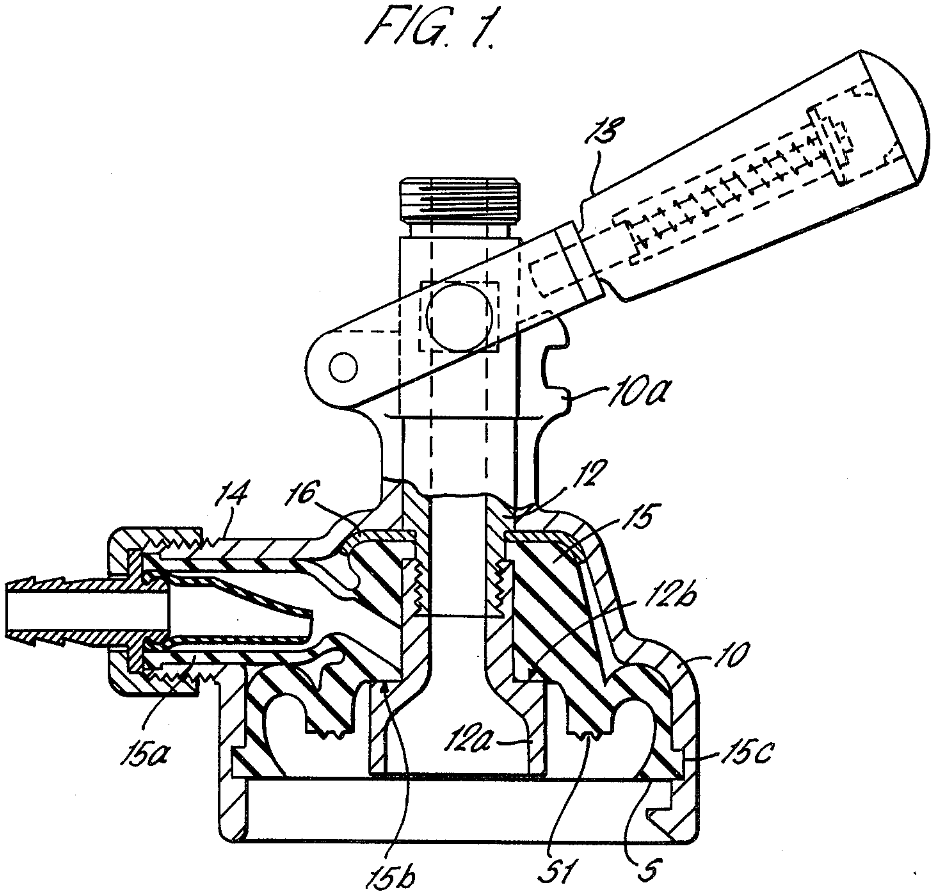
FIG. 1 is a sectional view of the coupling head showing the plunger in its raised position, FIG. 2 a part sectional view showing the coupling head down with the cask broached and gas pressure entering the cask.
Figure 2:
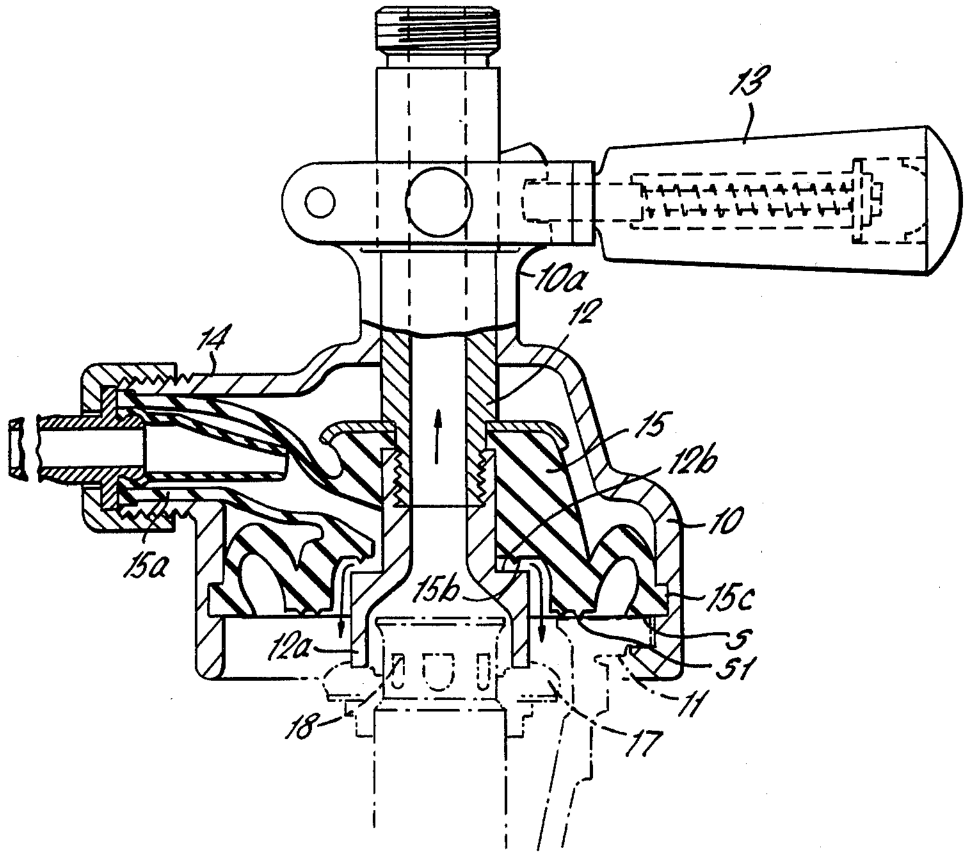

Referring first to FIGS. 1 and 2, the coupling head consists of a rigid shell 10 having an upstanding tubular portion 10*a* and means at its lower end to engage on the bung hole outlet collar 11 in known manner. An axially sliding hollow plunger 12 is located in the portion 10*a* the plunger having a detachable head portion 12*a*, the plunger being operated by a lever 13. The shell has a laterally projecting hollow stub 14 to which the source of gas pressure is connected.

A resilient liner 15 is located within the shell 10, this liner having an extension 15*a* which is received within the stub, the extension having a duct therethrough from gas inlet to the plunger head. The plunger head passes through a bore through the liner 15 and has an annular surface 15*b* which seats on a shoulder 12*b* on the plunger head when in the raised position the liner also providing a seal around the plunger head.

It will be seen therefore, that when the plunger is raised, gas pressure is blocked off by the engagement of the surface 15*b* on the shoulder 12*b* and by the liner engaging around the plunger head.

The lower end of the liner has a flange 15*c* which engages in a groove around the lower end of the shell 10 to locate and hold said end, this end of the liner having a sealing surface part S which, when the coupling head is engaged on the bung hole outlet collar, seats on the upper surface of said collar. The liner also has a second sealing surface part S1 concentrically within the part S.

A plate washer 16 is located within the shell 10 this bearing on the upper surface of the liner 10 and engaging in a groove around the plunger.

After the coupling head has been engaged on the collar 11, in order to broach the cask, the lever 13 is moved down to move the plunger down. The plate washer 16 presses on the liner 15 and as the lower end of the liner is held on the collar 11 the liner is distorted so that the shoulder 12*b* moves away from the surface 15*b* so that gas pressure is applied into the cask around the outer surface of the plunger head. The lower end of the plunger head also has moved the ring seal 17 (FIG. 2) down and liquid can now pass out from the extractor tube head 18 up through the plunger, the lower end of the plunger head also maintaining a seal between the gas inlet and the liquid outlet.

The coupling head can be assembled and dismantled easily, by removing the plunger head 12*a* and the lever and gas inlet pipe assembly.

Figure 3:
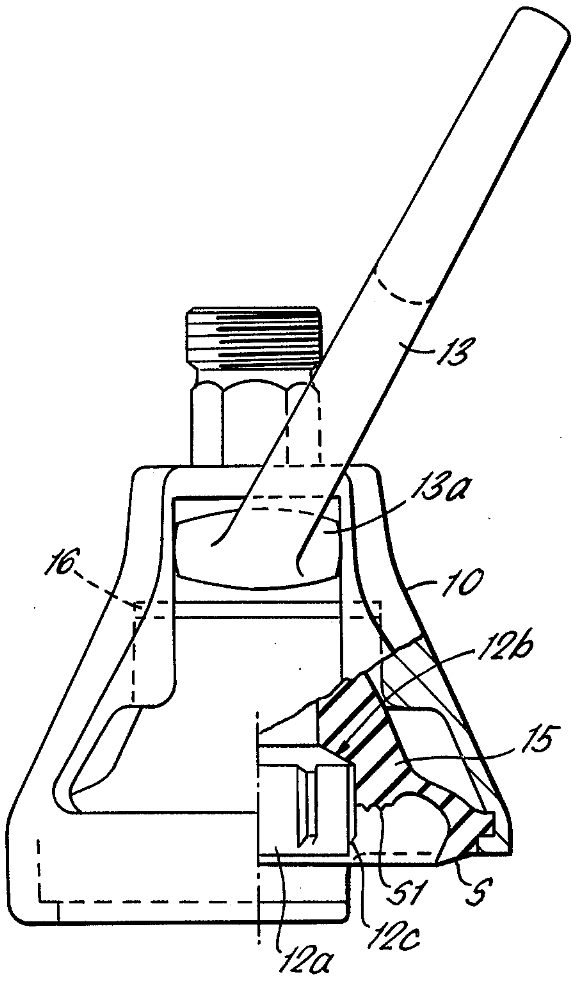
FIG. 3 is an elevation partly in section of another embodiment with the plunger raised.
Figure 4:
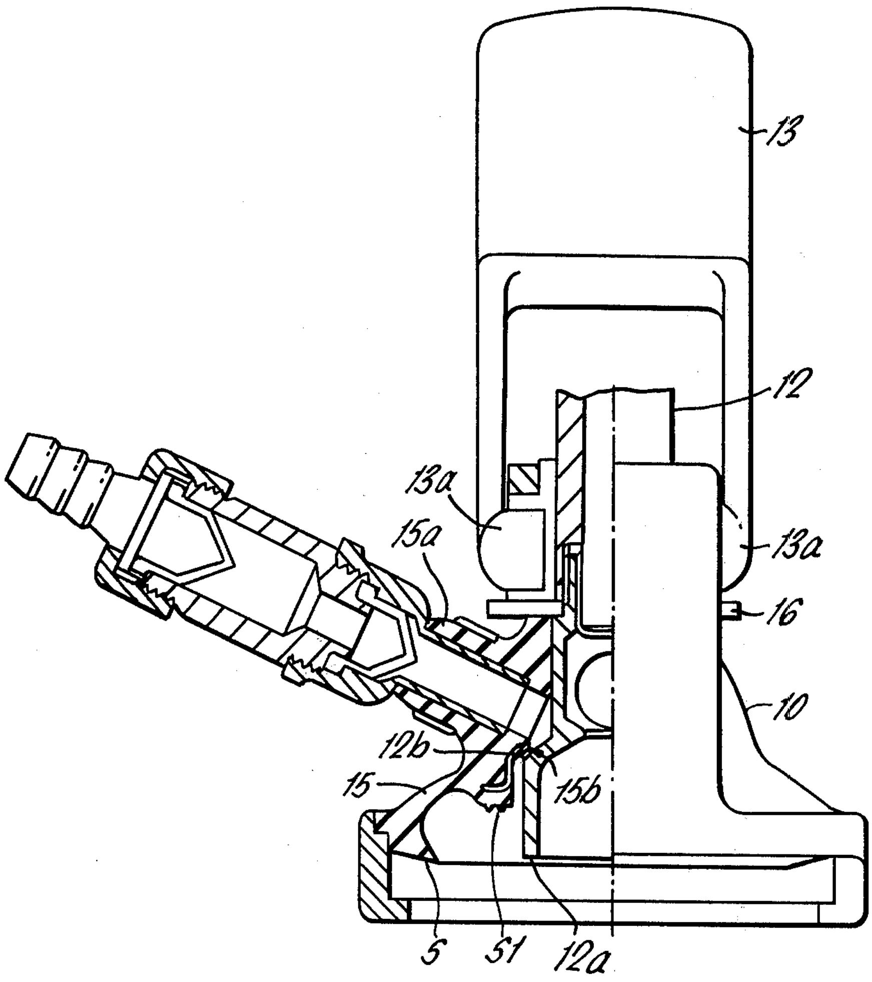
FIG. 4 is a part sectional view at a right angle to FIG. 3 with the left hand side of the shell omitted.
Figure 5:
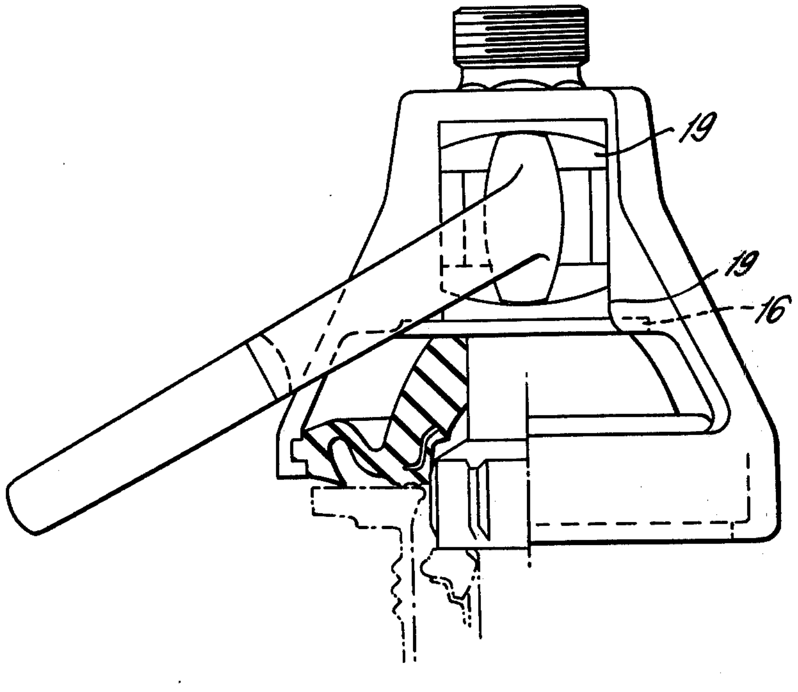
FIG. 5 is an elevation from the opposite side FIG. 3 with the plunger lowered.

Referring now to FIGS. 3–5, the construction is generally similar to that above described, and like reference letters are used for like parts. In this embodiment, the lever 13 is of yoke form to press on the plate washer 16, which washer extends at opposite sides through a slot through an upper part of the shell 10. The coupling head has no upper part 10*a* and the construction is easy to manufacture. The outer surface of the plunger head is fluted as at 12*c* enabling it to be unscrewed from the plunger 12 easily.

The lever 13 comprises a yoke with cam portions 13*a*, between saddles 19 so that when the lever is moved from the raised position to the lowered position, the lower saddle is moved down to bear on the plate washer 16 to deform the liner 15 as will be clear from FIG. 5.

The coupling head of FIGS. 3–5 is easy to manufacture and can be dismantled and assembled easily.

It will be noted that the liner also forms a seal around the plunger in both embodiments and both when the plunger is raised or lowered so that gas cannot pass upwardly out of the coupling head.

I claim:

1. A coupling and dispenser head for pressurised casks for liquids having a cask outlet including a ring seal, said head including a rigid cup-like inverted shell with means at its lower end to engage on a collar around the bung hole outlet of the cask and having an inlet for gas under pressure, a hollow plunger axially disposed within the shell, a manually operated lever connected to said plunger for axially moving it, said plunger including a head at its lower end to co-operate with said ring seal at the cask outlet, whereby, with the coupling head engaged on the cask, when the plunger is moved down from its raised position the plunger depresses the ring seal to broach the cask, characterised by a resilient liner within the shell and through which the plunger passes, said liner having a duct therethrough leading from the gas inlet to the plunger surface and an inner surface part engaging on the plunger head when the plunger is in its raised position to seal the gas inlet and a lower portion to seat on and seal the cask outlet around the ring seal and wherein downward movement of the plunger causes its head to depress the ring seal and also to distort the liner thereby to break the gas seal around the plunger head so that gas pressure enters the cask around the ring seal.

2. A coupling and dispenser head as claimed in claim 1, wherein a plate washer is provided in the coupling head above and to bear on the top of the liner, which washer is secured to the plunger whereby when the plunger is moved down, said washer presses the liner down to distort same.

3. A coupling head as claimed in claim 2, wherein the lever comprises a yoke with cam portions between saddles, whereby when the lever is moved down, the lower saddle is moved down to bear on the plate washer.

4. A coupling head as claimed in claim 1, wherein the shell has an upstanding tubular portion in which the plunger is located the plunger head being within the shell and liner and removeably secured to the lower end of the plunger.

5. A coupling head as claimed in claim 1, wherein the lower liner portion has a double sealing surface.

* * * * *